Dec. 9, 1952  S. B. ALCORIZA  2,621,265
SWITCH FOR MOTOR VEHICLE SIGNALS
Filed Nov. 22, 1949
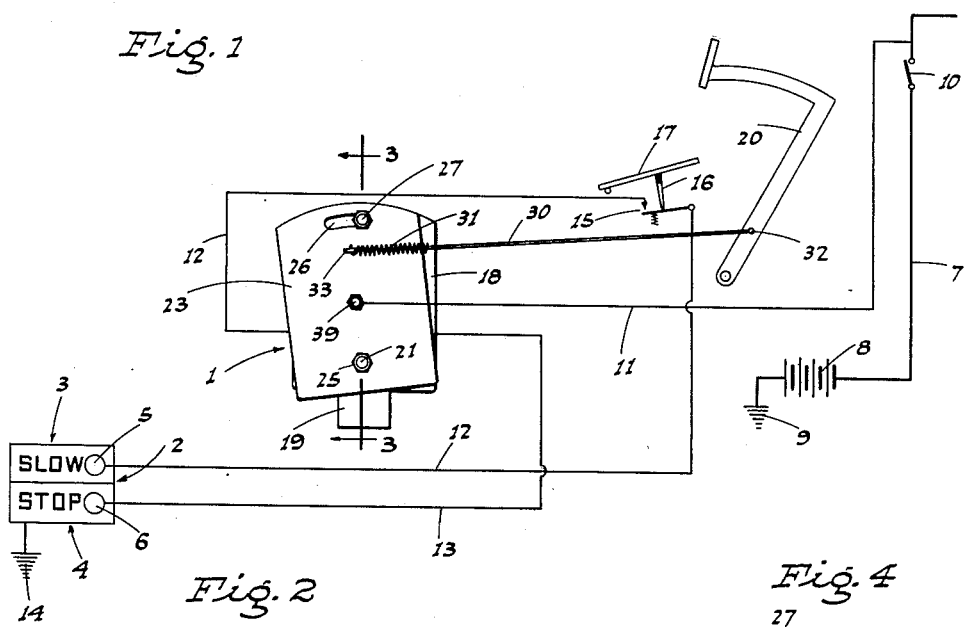
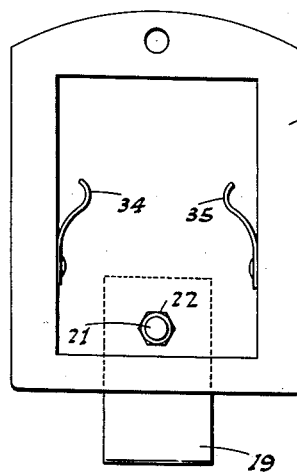
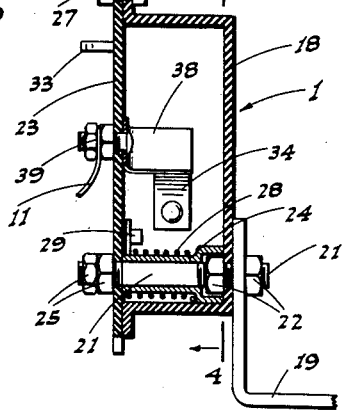
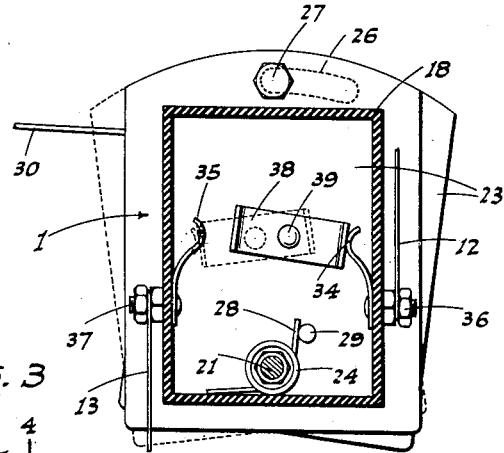
INVENTOR
Sofronio B. Alcoriza
ATTORNEYS Patented Dec. 9, 1952

2,621,265

UNITED STATES PATENT OFFICE 2,621,265

SWITCH FOR MOTOR VEHICLE SIGNALS

Sofronio B. Alcoriza, Walnut Grove, Calif.

Application November 22, 1949, Serial No. 128,868

3 Claims. (Cl. 200—6)

This invention is directed to, and it is an object to provide, an improved switch for controlling the operation of electric warning signals on a motor vehicle; the present invention being an improvement over my United States Letters Patent No. 1,878,090.

Another object of the invention is to provide a novel switch for the effective control of the circuit of a motor vehicle signal unit which includes two separate electric signals, as for example, "slow" and "stop"; the circuit being arranged so that the "slow" signal is energized when the accelerator pedal is foot-released, and the "stop" signal is energized when the foot brake is applied.

A further object of the invention is to provide a switch, for the purpose described, which is adapted to be arranged in connection with the foot brake lever, and to respond to brake applying motion thereof so as to cause the circuit to open with respect to the "slow" signal and close with respect to the "stop" signal.

An additional object of the invention is to provide a switch, as above, which is designed for ease and economy of manufacture, as well as convenience of installation, and long satisfactory operation.

Still another object of the invention is to provide a practical and reliable switch for motor vehicle signals, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the switch as in use; the switch being shown in connection with a diagrammatic illustration of the signal circuit.

Fig. 2 is an elevation of the switch box from the open side; the closure plate being removed.

Fig. 3 is a cross section of the switch on line 3—3 of Fig. 1.

Figure 4 is a sectional elevation of the switch on line 4—4 of Fig. 3.

Referring now more particularly to the characters of reference on the drawings, the novel switch to which the present invention is directed is indicated generally at 1; said switch 1 being adapted—in the present embodiment—to control an electric signal unit, indicated generally at 2. The signal unit 2 is adapted to be mounted on a motor vehicle exposed to the rear, and is of dual type, including one electric signal 3 which reads "slow" and another electric signal 4 which reads "stop." The signals 3 and 4 include separate electric globes 5 and 6, respectively.

The circuit for the signals 3 and 4 of the signal unit 2 comprises the following:

The numeral 7 indicates the hot or energizing lead of the ignition circuit of the motor vehicle; such lead 7 connecting, at one end, to the vehicle battery 8, and—as is conventional—such battery is grounded on the opposite side, as at 9. The conventional ignition switch is interposed in the ignition circuit lead 7, as at 10. The energizing lead of the signal circuit is indicated at 11 and extends from the ignition circuit lead 7 beyond the ignition switch 10 to connection with the switch 1 in the manner hereinafter described in detail.

Separate parallel leads 12 and 13 extend from opposite sides of the switch 1 to the electric globes 5 and 6 of the signals 3 and 4 respectively; said globes being grounded, on the side opposite the above leads, as at 14, to complete the circuit.

The separate parallel lead 12 has another switch 15 interposed therein, and said switch 15 is linked, as at 16, to the accelerator pedal 17 in a manner so that when such pedal is released the switch 15 closes. The purpose of this arrangement will hereinafter appear.

The switch 1 comprises an upstanding, hollow switch box 18 of dielectric material; such switch box being initially open toward one side, as clearly shown in Fig. 2. The switch box 18 is supported, from the other or closed side, by a mounting bracket 19 adapted to be rigidly secured to a fixed part of the vehicle directly to the rear of its brake pedal lever 20; the switch box 18 being mounted with its initially open side facing laterally of the direction of travel.

The switch box 18 is affixed to the mounting bracket 19 by a horizontal, laterally extending stud 21 which extends through the back of the switch box and the bracket; such parts being clamped together on the stud by nuts 22. The stud 21 is of substantial length and projects out of the initially open side of the switch box 18, whereby a flat, dielectric closure plate 23 is pivoted on said stud in a vertical longitudinal plane for rocking motion in said plane, while at the same time closing the initially open side of said switch box. The dielectric closure plate 23 is of a size or configuration such that it may swing or rock across the opening in the switch box while remaining as a closure therefor.

A spacer sleeve 24 is disposed on the stud 21 within the switch box 18, while nuts 25 on said stud outwardly of the closure plate 23 prevent escape of the latter. With this arrangement the closure plate 23 is effectively secured in place, yet maintained for the desired rocking motion in a longitudinal vertical plane.

At its upper end the dielectric closure plate 23 is formed with an arcuate slot 26 concentric to the stud 21, and a limit bolt 27, affixed to the top of the switch box 18, projects through said slot, whereby to limit rocking motion of said closure plate 23 about the stud 21.

A helical torque spring 28 surrounds the spacer sleeve 24, having one end bearing on the bottom of the switch box 18 and the other end bearing on a pin 29 on the inner or back side of the closure plate 23.

The torque spring 28 normally acts to rock the closure plate 23 to the limit of its motion in a rearward direction; i. e. in a direction away from the brake pedal lever 20.

A pull linkage 30, including a tension spring 31, is connected between the brake pedal lever 20 intermediate its ends, as at 32, and the closure plate 23 adjacent its upper end, as at 33. Upon forward swinging of the brake pedal lever 20, to apply the motor vehicle brakes, the pull linkage 30 rocks the closure plate 23 against the torque of spring 28 to a forward or advanced position, as shown in dotted lines in Fig. 4.

The purpose of the foregoing rocking of the closure plate 23 is as follows:

Within the switch box 18, and on the front and rear ends thereof respectively, said box is fitted with opposed spring contact fingers, indicated at 34 and 35; such fingers being secured in place by terminal bolts 36 and 37 respectively. The lead 12 of the signal circuit connects to the terminal bolt 36, while the lead 13 of said circuit connects to the terminal bolt 37.

On the inner side thereof, and centrally of its side edges, the rockable closure plate 23 is fitted with a transverse contact bar 38 secured in place by a terminal bolt 39; such contact bar being elongated and of generally U-shape but of a length lesser than the normal span between the contact fingers 35. The energizing lead 11 of the signal circuit connects to the terminal bolt 39.

When the closure plate 23 is in its normal or retracted position relative to the brake pedal lever 20, the contact bar 38 is in engagement with the spring finger 34, closing the signal circuit—as far as switch 1 is concerned—relative to the "slow" signal 3. However, as long as the accelerator pedal 17 is depressed, during operation of the motor vehicle, the switch 15 is open and said "slow" signal 3 is deenergized. Upon the accelerator pedal 17 being released, switch 15 closes and the "slow" signal 3 is energized through lead 11, switch 1, and lead 12.

Thereafter, when the brake pedal lever 20 is swung forward, for vehicle deceleration, the pull linkage 30 swings or rocks the closure plate 23 forwardly from its normal position, breaking contact bar 38 from contact finger 34, and shifting said contact bar into engagement with contact finger 35. As the contact bar 38 escapes the contact finger 34 and comes into engagement with the contact finger 35, as above, the circuit through lead 12 is broken and is closed through the lead 13 so as to deenergize the "slow" signal 3 and energize the "stop" signal 4.

In the foregoing manner an automatic and effective control of the "slow" and "stop" signals 3 and 4, respectively, is attained; all without any attention on the part of the operator of the motor vehicle. In this manner the operator of a following motor vehicle is automatically warned of slowing or stopping of the vehicle upon which the signal unit 2 is mounted; thus providing greater safety and avoiding accidents which might occur in the absence of proper signaling.

The switch 1 is designed so that it may be manufactured inexpensively, and installed without difficulty; the design of the switch being such that it provides for effective long-time operation for the intended purpose.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A two-circuit switch comprising a mounting box open on one face, laterally opposed contacts in the box adapted for insertion in separte circuits, a plate over the open face of the box, means pivoting the plate on the box in a plane between and offset from the contacts for lateral swinging movement, a single contact adapted for connection in both circuits mounted on the plate for alternate engagement with the box contacts upon lateral swinging of the plate, and a spring in the box acting directly between the box and plate to swing the plate in one direction to normally yieldably hold the plate contact engaged with one of the box contacts; the plate being adapted for connection with a pull element to swing the same against the resistance of the spring to bring the plate contact into engagement with the other box contact.

2. A switch comprising a mounting box open on its front face, a contact in the box, a cover plate over the open face of the box having a contact for engagement with the box contact, a bracket plate for supporting the box engaging the back side thereof, and a unit serving both to detachably secure the box to the bracket and as a pivot for the cover plate so that the latter may be swung on its pivot to engage and disengage the contacts; said unit comprising a stud projecting across the box through the bracket plate, the back of the box and the cover plate, nuts on the stud engaging opposite sides of the bracket plate and box-back to releasably clamp the same together, a spacer on the stud between the back of the box and the cover plate and shaped to closely embrace the stud and adjacent nut, and a nut on the stud outwardly of the cover plate.

3. A switch as in claim 2, with a torsion spring on the spacer bearing at one end against the box and acting on the cover plate to swing the same in a direction to maintain the contacts separated.

SOFRONIO B. ALCORIZA.

REFERENCES CITED

The following references are of record in the file of this patent:

UNITED STATES PATENTS

| Number | Name | Date |
|---|---|---|
| 774,896 | Robertson | Nov. 15, 1904 |
| 2,096,069 | Seiden | Oct. 19, 1937 |
| 2,100,426 | Berger et al. | Nov. 30, 1937 |
| 2,128,769 | Finnell | Aug. 30, 1938 |
| 2,141,075 | Ackers | Dec. 20, 1938 |
| 2,210,793 | Butler | Aug. 6, 1940 |
| 2,463,083 | Coombs | Mar. 1, 1941 |